United States Patent [19]

Akado et al.

[11] 4,112,896
[45] Sep. 12, 1978

[54] TEMPERATURE RESPONSIVE DEVICE FOR INTERNAL COMBUSTION ENGINES

[75] Inventors: Hajime Akado, Anjo; Yoshiro Uchida, Toyota; Akihide Yamaguchi, Kariya; Takao Nonoyama, Toyota; Suminobu Ootsubo, Toyota; Toshiro Harada, Okazaki, all of Japan

[73] Assignee: Nippondenso Co., Ltd., Kariya, Japan

[21] Appl. No.: 872,776

[22] Filed: Jan. 27, 1978

[30] Foreign Application Priority Data

Jan. 27, 1977 [JP] Japan ............................... 52-8489[U]

[51] Int. Cl.² ................................................ F02M 31/00
[52] U.S. Cl. ........................... 123/122 D; 123/122 H; 236/86; 236/101 C
[58] Field of Search .................. 123/122 D, 122 H; 236/86, 101 C, 101 E, 87

[56] References Cited

U.S. PATENT DOCUMENTS 3,394,687 7/1968 Scott ............................... 123/122 D
3,841,551 10/1974 Ota ........................................ 236/86

FOREIGN PATENT DOCUMENTS 2,345,074 4/1974 Fed. Rep. of Germany ...... 123/122 H

Primary Examiner—Ronald H. Lazarus
Attorney, Agent, or Firm—Cushman, Darby & Cushman

[57] ABSTRACT

A thermostatic valve, used in an engine for introducing warmed air to the engine and air to a slow-port passage of a carburetor, has a valve casing defining therein first and second compartments. A first valve member is disposed in the first compartment to control the introduction of the intake vacuum or the atmospheric pressure to a negative pressure motor mounted on a throat of an air cleaner. A second valve member is disposed in the second compartment to control the communication between a float chamber and the slow-port passage of the carburetor when the temperature of the air introduced into the engine exceeds a preset value so as to prevent excessive richness of an air-fuel mixture.

2 Claims, 5 Drawing Figures

TEMPERATURE RESPONSIVE DEVICE FOR INTERNAL COMBUSTION ENGINES

BACKGROUND OF THE INVENTION

(1) Field of the Invention

The present invention relates to a temperature responsive device for an internal combustion engine to automatically control temperature of intake air to be supplied to the engine, and more particulary relates to an improved construction of a thermostatic valve having dual functions, one of which is to supply air to a slow-port passage of a carburetor in response to the temperature of the engine or an air cleaner so as to prevent excessive richness of an air-fuel mixture to be fed to the engine and the other of which is to control a negative pressure motor in response to the above engine temperature, the negative pressure motor proceeding a switching operation for introducing warmed air into the carburetor through the air cleaner and a control of the amount of the warmed air.

(2) Description of Prior Art

In a conventional thermostatic device for an internal combustion engine, a thermostatic valve is provided to detect temperature of intake air during a time when the temperature of the ambient air is cold especially during a winter season and to actuate a negative pressure motor as a function of the detected temperature so as to introduce warmed air to the engine, and another thermostatic valve is provided to introduce additional air into an intake manifold for the purpose of preventing an extreme richness of an air-fuel mixture fed to the engine during a time when the ambient temperature is relatively high, especially during a summer season.

The conventional thermostatic device just described is disadvantageous in view of necessity of two kinds of thermostatic valves, complicated pipe lines for communicating the thermostatic valves with the associated portions such as the intake manifold, the carburetor and so on in an automotive engine compartment, and its high cost.

In another well-known thermostatic device of this kind, for example disclosed in U.S. Pat. No. 3,394,687, in which one valve is employed to proceed the above dual functions, a valve member is slidably but sealingly disposed in a valve housing being actuated to move down-and-upwardly by a temperature responsive expanding material such as wax, the down-and-upward movement of the valve member controlling both the amount of warmed air supplied to an engine through a carburetor and the amount of additional air fed to the engine. The thermostatic valve has, however a disadvantage that a reliable operation may not be ensured for a long time since clearance between the outer surface of the valve member and the surrounding inner surface of the valve housing for the valve member becomes larger as it is used.

SUMMARY OF THE INVENTION

It is, therefore, an object of the present invention to provide a thermostatic device for an internal combustion engine which includes one thermostatic valve having dual functions for controlling introduction of warmed air to the engine as well as introduction of additional air to the engine through a slow-port passage of a carburetor as a function of the ambient temperature.

It is another object of the present invention to provide an improved thermostatic valve to overcome the above disadvantages.

These and other objects, advantages and features of the present invention will become more apparent from the following description read in connection with the accompanying drawings.

DETAILED DESCRIPTION OF THE PREFERRED EMBODIMENTS

Figure 1:
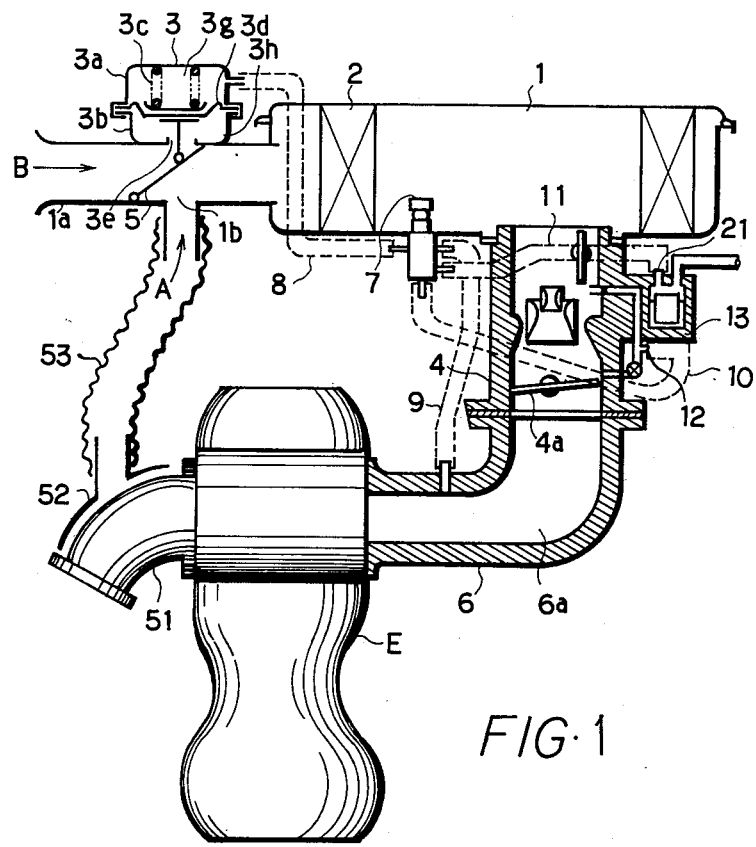
FIG. 1 is a schematic view partly in section of a temperature responsive device for an internal combustion engine in accordance with the present invention.

In FIG. 1 showing a thermostatic device for an internal combustion engine according to the present invention, an air cleaner 1 is communicated with an internal combustion engine E through a carburetor 4 and an intake manifold 6 as is well known. A filter element 2 is mounted in the air cleaner 1 for filtering air entering the carburetor 4 from a throat 1a of the air cleaner 1, which opens to the atmosphere. The carburetor 4 mixes fuel with air flowing therethrough as in the conventional manner to supply an air-fuel mixture to the engine E, wherein a throttle valve 4a linked with an acceleration pedal (not shown) is pivotally mounted to control the amount of the air-fuel mixture. An exhaust manifold 51 is communicated with the atmosphere to convey the exhaust gas to the atmosphere.

A switching valve 5 is pivotally mounted in the throat 1a to open and close an aperture 1b for permitting warmed air A to enter the air cleaner 1 when the aperture 1b is opened. The aperture 1b is connected through a conduit 53 to a heat receiving plate 52 which surrounds a portion of the exhaust manifold 51. Air from the atmosphere enters the conduit 53 passing along the plate 52 while being warmed by hot outer walls of the exhaust manifold 51 surrounded by the plate 52. When the switching valve 5 closes the aperture 1b, the ambient (cold) air B enters the air cleaner 1.

The switching operation of the valve 5 is carried by a negative pressure motor 3 mounted on the throat 1a which includes an upper and a lower housings 3a and 3b fixed to the upper portion of the throat 1a, a diaphragm 3d interposed between the housings 3a and 3b to form a sealed negative pressure chamber 3g and a chamber 3h communicated with the atmosphere, a spring 3c disposed in the chamber 3g for resiliently urging the diaphragm 3d in a downward direction, and a rod 3e connecting the diaphragm 3d with the switching valve 5 for actuating the same to open and close the aperture 1b in accordance with the down-and-upward movement of the diaphragm 3d. When the negative pressure is applied to the chamber 3g, the diaphragm 3d moves upwardly against the resilient force of the spring 3c with the valve 5 being opened as shown in FIG. 1, while when the negative pressure is removed from the chamber 3g, that is when the atmospheric pressure is applied to the chamber 3g the diaphargm 3d moves downwardly due to the urging force of the spring 3c. The chamber 3g is communicated with the inside 6a of the intake manifold 6 through a conduit 8, a thermostatic valve 7 and a conduit 9 to apply the intake vacuum at the intake manifold to the chamber 3g when the thermostatic valve 7 connects the conduit 9 with the conduit 8 as a function of the temperature of the air in the air cleaner 1.

Figure 2:
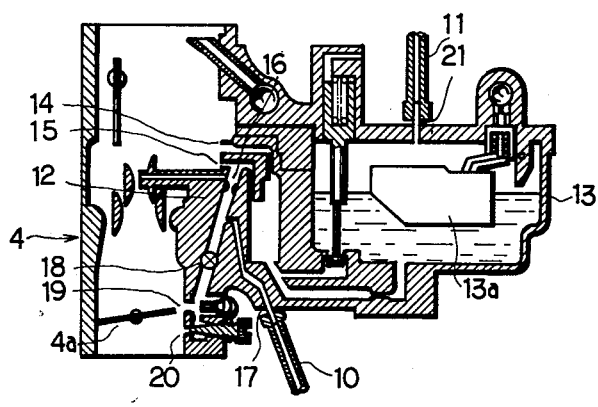
FIG. 2 is an enlarged sectional view of a carburetor shown in FIG. 1.

The detailed construction of the carburetor 4 will be explained with reference to FIG. 2. In FIG. 2, numeral 13 designates a float chamber for storing fuel therein, in which a float 13a is disposed to regulate the level of the liquid fuel. A port 21 opening to the float chamber 13 (an upper portion of the chamber, which is filled with air) is coupled to a conduit 11 through which the float chamber is communicated with a third port of the thermostatic valve 7.

Numerals 14 and 15 designate air bleed ports, and numeral 16 designates a metering orifice constituting an inlet portion of a slow-port passage 12. A solenoid valve 18 is disposed in the passage 12, which is actuated to open the same in synchronism with the closure of an engine key switch (not shown). Numeral 19 designates a slow-port connected to the passage 12 and opening to the induction passage of the carburetor 4 at a portion slightly upstream of the throttle valve 4a when it is closed. Numeral 20 designates an idle port connected to the passage 12 and opening to the induction passage of the carburetor downstream of the throttle valve 4a. A branch passage 17 is formed in the carburetor 4 being connected at one end to the slow-port passage 12 and at the other end to a conduit 10 through which the slow-port passage 12 is communicated with a fourth port of the thermostatic valve 7.

The detailed construction will be explained with reference to FIG. 3 hereinafter.

A temperature responding portion 22 comprises a top portion 22a made of a heat conducting material such as copper, a temperature responsive expanding material 22b such as wax sealed in the top portion 22a by means of a diaphragm 22e so that the diaphragm 22e is expansible in accordance with the expansion of the wax 22b, a housing 22d fixed to the top portion 22a, and a driving lever 22c slidably supported in a bore of the housing 22d so that the driving lever 22c is moved back and forth in accordance with the expansion of the wax 22b and thereby the movement of the diaphragm 22e. The temperature responding portion 22 is exposed inside of the air cleaner 1 for responding the temperature thereof.

The lower end of the housing 22d is screwed into a housing 23 made of a synthetic resin, which includes a central bore 23a for providing a space to enable a free up- and downward movement of the driving lever 22c, apertures (air vent ports) 24 communicating the bore 23a with the atmosphere (the inside of the air cleaner 1 according to the invention), and a first valve seat 25 is formed at an undersurface of the housing 23 at which the lower end of the bore 23a terminates.

A valve casing 26 made of a synthetic resin is secured to the housing 23 by means of, for example ultrasonic-wave welding to thereby seal the cylindrical inside of the valve casing 26 from the atmosphere, wherein the housing 23 serves as an upper wall of the valve casing 26. The valve casing 26 comprises a first pipe portion (or port) 28 having a restriction 27 of 0.7φ for preventing a rapid air flow therethrough and connected to the negative pressure motor 3 through the conduit 8, and a second pipe portion (or port) 29 connected to the intake manifold 6 through the conduit 9.

The valve casing 26 also comprises an inwardly extending flanged portion 30 at an intermediate section of the valve casing 26 to divide the inside thereof into upper and lower compartments 43 and 47, a second valve seat 31 formed at an undersurface of the flanged portion 30, an aperture 32 formed in the flanged portion 30 opening to the lower compartment 47, and a third pipe portion (or port) 33 connected to the aperture 32, the third pipe portion 33 being also connected to the float chamber 13 of the carburetor 4 through the conduit 11.

A bottom cover 39 made of a synthetic resin is secured to the lower end of the valve casing 26 by means of ultrasonic-wave welding to seal the lower compartment 47 from the atmosphere. The bottom cover 39 has a fourth pipe portion (or port) 41 to be coupled to the conduit 10 through which the lower compartment 47 is connected to the slow-port passage 12 of the carburetor 4.

A first valve member 34 is slidably disposed in the upper compartment 43 to open and close the communication between the upper compartment 43 and the atmosphere through the air vent ports 24. An annular gasket 35 made of silicone rubber is fixed to an upper surface of the valve member 34 for abutting on and separating from the first valve seat 25 in accordance with the upward and downward movements of the valve member 34. An annular projection 34a formed on the upper surface of the valve member 34 is guided along the inner wall of the central bore 23a of the housing 34 and also receiving the lower end of the driving lever 22c. An annular shoulder 34b is formed on the undersurface of the valve member 34 to form an annular recess 34c.

A spring 36 is disposed in the upper compartment 43 for urging the valve member 34 in an upward direction so that the gasket 35 abuts on the valve seat 25 when the expansion of the wax 22b is at minimum.

A second valve member 37 is also slidably disposed in the inside of the valve casing 26 for opening and closing the communication between the third and fourth pipe portions 33 and 41. The valve member 37 comprises a cylindrical portion 37a passing through a central opening 30a formed in the flanged portion 30 and protruding into the upper compartment 43, and a flanged portion 37b disposed in the lower compartment 47. An annular gasket 38 made of silicone rubber is fixed to the upper surface of the flanged portion for abutting on and separating from the second valve seat 31 to thereby close and open the aperture 32 formed in the inwardly extending flanged portion 30. A spring 40 is disposed in the lower compartment 47 for urging the second valve member 37 in the upward direction so that the gasket 38 may close the aperture 32.

A cup-shaped deformable diaphragm 42 made of synthetic rubber is disposed in the upper compartment 43, whose upper end 42a is bent inwardly along the inner surface of the cylindrical bore 37c of the valve member 37 and fixed thereto by suitable bonding agent, and whose lower end 42b is flanged and abutted on the upper surface 30b of the inwardly extending flanged portion 30 by the urging force of the spring 36.

A central projection 34d formed on the undersurface of the first valve member 34 extends downwardly and protrudes into the cylindrical bore 37c of the second valve member 37 for guiding the first valve member 34 with respect to the second valve member 37.

Figure 3:
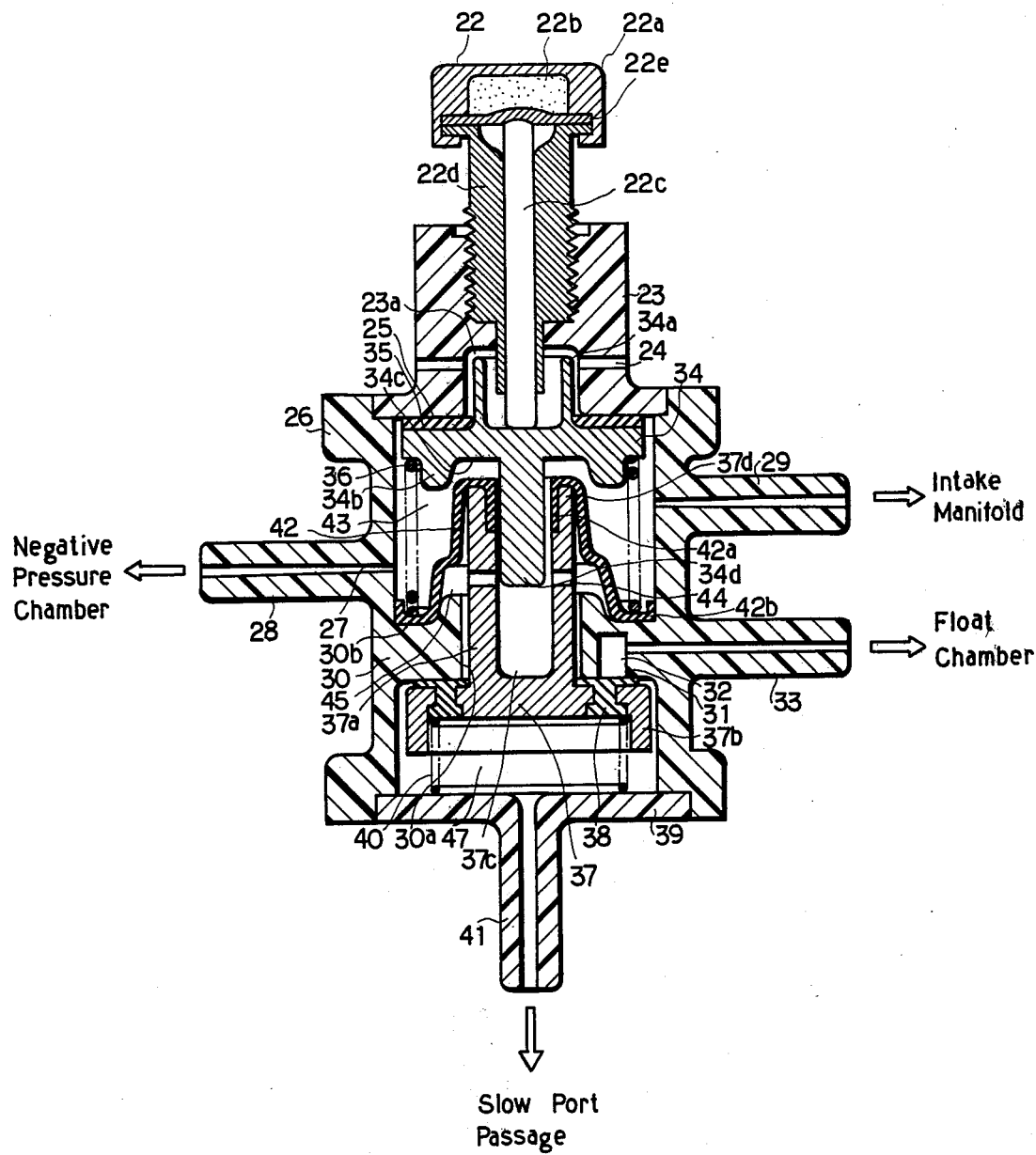
FIG. 3 is an enlarged sectional view showing a thermostatic valve according to an embodiment of the present invention.

When the expansion of the wax 22b is at minimum, the top portion 37d of the second valve member 37 covered with the diaphragm 42 is separated from a flat face of the annular recess 34c as shown in FIG. 3.

A plurality of apertures 44 are formed on the cylindrical portion 37a of the second valve member 37 so that a space 45 surrounded by the diaphragm 42 may be communicated with the cylindrical bore 37c so as to make the pressure in the space 45 substantially equal to that in the upper compartment 43. Accordingly, the diaphragm 42 is prevented from a mechanical damage caused by an extreme pressure difference thereacross.

The operation of the thermostatic valve 7 will be explained hereinafter.

When the ambient temperature is low, for example in a winter season, the temperature of the air introduced into the engine E is also low causing an unfavorable combustion of an air-fuel mixture. When the ambient temperature is low as above, the temperature responsive expanding material 22b does not expand so that the driving lever 22c is not moved, with the result that the first valve member 34 is brought into contact with the first valve seat 25 of the housing 23 by the urging force of the spring 36. Then, since a first passageway, which interconnects the air vent ports 24 opening to the atmosphere with the first port 28 communicated with the negative pressure chamber 3g of the negative pressure motor 3 through the conduit 8, is closed, the intake vacuum in the intake manifold 6 is transmitted to the negative pressure chamber 3g of the motor 3 through a second passageway of the second port 29, the first compartment 43 and the first port 28, driving the valve 5 as shown in FIG. 1. When the valve 5 opens the aperture 1b, warmed air A warmed by the exhaust manifold 51 is permitted to enter the air cleaner 1 and then to the engine E, thus ensuring a smooth starting and operation of the engine. Since the intake vacuum is transmitted to the negative pressure chamber 3g through the restriction 27, the switching operation of the valve 5 is smoothly carried out.

During the above operation period, the second valve member 37 is also brought into contact with the second valve seat 31 of the flanged portion 30 by means of the gasket 38 by the urging force of the spring 40. Then, a third passageway for connecting the third port 33 communicated with the float chamber 13 of the carburetor 4 with the fourth port 41 communicated with the slow-port passage 12 is closed since the aperture 32 is closed by the gasket 38, so that no air may flow into the slow-port passage 12.

When the warmed air A is permitted to enter the air cleaner 1 as described above, the temperature of the air surrounding the thermostatic valve 7 gradually increases. When the temperature of the air in the air cleaner 1 increases and exceeds a preset value of, for example 25° C., the expansion of the wax 22b drives the lever 22c in the downward direction so that the first valve member 34 is forced to move downwardly separating from the first valve seat 25. Thus, the first passageway is opened to connect the first port 28 with the air vent ports 24. As a result, the negative pressure chamber 3g of the motor 3 is communicated with the atmosphere, and thereby the switching valve 5 closes the aperture 1b, so that the ambient cold air B enters the air cleaner 1. Repeating the above operation of the switching valve 5 controls the temperature of the air introduced into the engine within a desired range.

When the temperature of the air in the air cleaner is further increased and exceeds another preset value of, for example 65° C., the downward movement of the driving lever 22c is increased to bring the first valve member 34 into an engagement with the second valve member 37 at the annular recess 34c and the top portion 37d, and further to drive the second valve member 37 in the downward direction separating the gasket 38 from the second valve seat 31. The aperture 32 formed in the flanged portion 30 and thus the third passageway is opened to introduce air from the float chamber 13 to the slow-port passage 12 to decrease the amount of fuel flowing through the slow-port passage 12. Thus, excessive richness of the air-fuel mixture during an idling and a low-load operation is prevented.

In the above operation, when the annular recess 34c of the first valve member 34 is engaged with the top portion 37d of the second valve member 37, the second (lower) compartment 47 is air-tightly insulated from the first (upper) compartment 43 by the diaphragm 42. Accordingly, even though the intake vacuum is introduced into the first compartment 43 from the port 29, no adverse affect occurs on the air supply to the slow-port passage 12.

When the temperature of the air introduced into the engine E is decreased, the volume of the wax 22b is contracted and the second valve member 37 is lifted upwardly by the urging force of the spring 40 in accordance with the contraction of the wax 22b. Then, the aperture 32, that is the third passageway is closed when the gasket 38 is brought into contact with the second valve seat 31, so that air supply to the slow-port passage 12 is shut off.

When the temperature of the air in the air cleaner 1 is further decreased, the first valve member 34 is lifted upwardly by the urging force of the spring 36 in accordance with the contraction of the wax 22b, to close the air vent ports 24, that is the first passageway.

Figure 4:
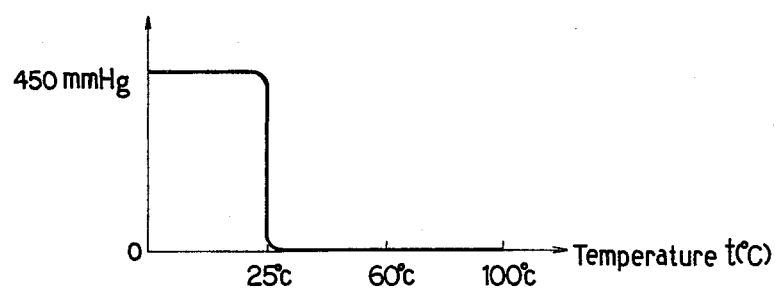
FIGS. 4 and 5 are graphical views showing characteristics of negative pressure in a negative pressure motor and an amount of additional air fed to the engine with respect to temperature variations in an air cleaner in accordance with operation of the thermostatic valve shown in FIG. 3.
Figure 5:
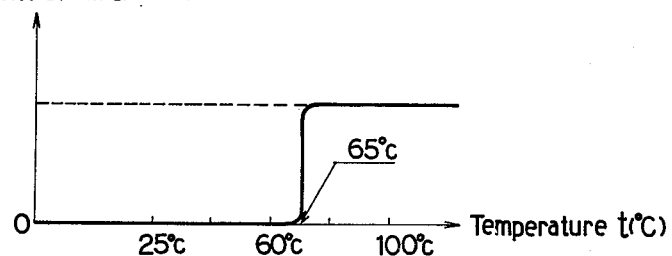

FIGS. 4 and 5 show characteristics of the valve 7 described above.

FIG. 4 shows the amount of the negative pressure (intake vacuum) applied to the negative pressure chamber 3g of the motor 3 at the ordinate with respect to the temperature variations in the air cleaner 1 at the abscissa when the intake vacuum in the intake manifold 6 is constantly of 450 mmHg.

FIG. 5 shows the amount of air fed to the engine through the slow-port passage 12, that is the amount of air fed to the passage 12 at the ordinate with respect to the temperature variations in the air cleaner 1 at the abscissa when the negative pressure in the slow-port passage 12 is constantly of 100 mmHg.

In the above embodiment, the third port 33 of the valve 7 is connected to the float chamber 13 to introduce air to the slow-port passage 12 of the carburetor 4, however, the third port 33 can be communicated with the air cleaner to introduce the air in the air cleaner 1 to the slow-port passage 12.

What is claimed is:

1. In an internal combustion engine having
   an air cleaner connected to an intake manifold for supplying air thereto through a filter element in said air cleaner, said air cleaner having a throat opening to the atmosphere for introducing air from the atmosphere into said air cleaner, and a carburetor, connected between said air cleaner and said intake manifold, having a float chamber and a slow-port passage, a temperature responsive system comprising:

a switching valve pivotally mounted in said throat adjacent to an aperture formed in said throat for closing and opening the same;

a negative pressure motor mounted on said throat and having a negative pressure chamber and a movable diaphragm responding the negative pressure applied to said negative pressure chamber, said diaphragm being connected to said switching valve so that said switching valve is actuated to close and open said aperture in response to the movement of said diaphragm;

a conduit connected to said aperture at one end and opening to a portion of an exhaust manifold of said engine so as to introduce warmed air around said exhaust manifold into said air cleaner when said aperture is opened; and a thermostatic valve mounted in said air cleaner having an inlet connected to said intake manifold and an outlet connected to said negative pressure chamber, wherein said thermostatic valve comprises:

temperature responding means, exposed to the inside of said air cleaner, having a temperature responding expanding material and a driving lever driven by the expansion of said expanding material, the expansion thereof being responsive to the temperature of the air in said air cleaner;

valve casing means coupled to said temperature responding means and defining therein first and second compartments, said valve casing means having an air vent port for communicating said first compartment with the atmosphere, a first port for communicating said first compartment with said negative pressure chamber of said negative pressure motor, a second port for communicating said first compartment with the intake manifold of said engine, a third port for communicating said second compartment with the float chamber of said carburetor, and a fourth port for communicating said second compartment with the slow-port passage of said carburetor;

a first valve member disposed in said first compartment and operatively coupled to said driving lever of said temperature responding means for closing and opening said air vent port in accordance with the movement of said driving lever; and a second valve member disposed in said second compartment and operatively driven by said driving lever for closing and opening said third port in accordance with the movement of said driving lever, the communication between said third and fourth ports being established when said second valve member opens said third port.

2. A thermostatic valve for use with an internal combustion engine comprising:

temperature responding means (22), exposed to an inside of an air cleaner of an internal combustion engine, having a temperature responding expanding material and a driving lever driven by the expansion of said expanding material, the expansion thereof being responsive to the temperature of the air in said air cleaner;

valve casing means (26) coupled to said temperature responding means and defining therein first and second compartments (43, 47), said valve casing means having an air vent port (24) for communicating said first compartment with the atmosphere, a first port (28) for communicating said first compartment with a negative pressure motor mounted on a throat of said air cleaner, a second port (29) for communicating said first compartment with an intake manifold of said engine, a third port (33) for communicating said second compartment with a float chamber of a carburetor for said engine, and a fourth port (41) for communicating said second compartment with a slow-port passage of said carburetor;

a first valve member (34) disposed in said first compartment and operatively coupled to said driving lever of said temperature responding means for opening and closing said air vent port in accordance with the movement of said driving lever; and a second valve member (37) disposed in said second compartment and operatively driven by said driving lever for opening and closing said third port in accordance with the movement of said driving lever, the communication between said third and fourth ports being established through said second compartment when said second valve member opens said third port.

* * * * *